United States Patent [19]

Lee et al.

[11] Patent Number: 5,125,474
[45] Date of Patent: Jun. 30, 1992

[54] SOUND WAVE ABSORBING APPARATUS FOR AIR COOLED ENGINE

[75] Inventors: Michael C. Lee, Beaver Dam; James E. Muse, Columbus, both of Wis.

[73] Assignee: Deere & Company, Moline, Ill.

[21] Appl. No.: 807,809

[22] Filed: Dec. 13, 1991

Related U.S. Application Data

[63] Continuation of Ser. No. 558,134, Jul. 26, 1990, abandoned.

[51] Int. Cl.⁵ ................................. F01N 1/10
[52] U.S. Cl. .................................. 181/204; 181/224; 181/229
[58] Field of Search ............... 181/204, 205, 214, 217, 181/224, 225, 229

[56] References Cited

U.S. PATENT DOCUMENTS

| | | | |
|---|---|---|---|
| 3,857,453 | 12/1974 | Buttke et al. | 181/204 |
| 4,093,039 | 6/1978 | Moore et al. | 181/229 |
| 4,260,037 | 4/1981 | Eline | 181/204 |
| 4,289,096 | 9/1981 | Latham et al. | 123/198 E |
| 4,335,797 | 6/1982 | Simmons | 181/204 |
| 4,483,412 | 11/1984 | Couturier | 181/204 |

*Primary Examiner*—L. T. Hix
*Assistant Examiner*—Khanh Dang

[57] ABSTRACT

A sound wave absorbing air intake baffle is provided for reducing the level of sound reaching an operator on a vehicle having an air cooled engine with an upwardly opening air intake passage in the hood. The baffle includes first and second chambers carrying sound absorbing material and a sound wave deflecting structure spanning the air intake opening for deflecting sound waves into the chambers. To permit cooling air to be drawn through the passage around the deflecting structure and into the engine compartment, an air deflecting structure is positioned above the sound wave deflecting structure.

16 Claims, 2 Drawing Sheets

SOUND WAVE ABSORBING APPARATUS FOR AIR COOLED ENGINE

This application is a continuation of application Ser. No. 07/558,134, filed Jul. 26, 1990, now abandoned.

BACKGROUND OF THE INVENTION

1. Field of the Invention

The present invention relates apparatus for absorbing sound waves radiated from an air cooled engine and its cooling fan, and particularly to the use of such an apparatus with a lawn and garden vehicle.

2. Description of the Prior Art

Various laws and regulations make it desirable to restrict the level of lawn and garden vehicle sound to which the operator is exposed.

While compliance can and often is easily met by providing the operator of such vehicles with ear plugs and/or sound blocking personal protection devices, that type of compliance may not be practical in some circumstances. For example, sound blocking devices often block out the sounds of other vehicles, people and/or traffic which may be near the operator and of which he should be aware for his own and their safety. Further, the use of such protection makes it difficult for the operator to monitor the performance of the engine, belts, and other accessories as indicated by their respective sounds.

Sounds which radiate from engines and which must be controlled include the engine and its operating components, such as bearings, pistons, valves, rods, etc. On air cooled engines, significant volumes of air are required to maintain the desired engine operating temperature. To provide this air are cooling fans which generate substantial levels of sound.

Various structures have been utilized to absorb these various sounds before they reach an operator. For example, on the John Deere Model 185 air cooled lawn and garden tractor, the hood encloses the upper portions and top of the engine and serves to deflect and deaden the sounds radiating from the engine and its components. An optional feature provides for sound absorbing material to be attached to the inside of the hood enclosure to further absorb the sounds.

Since the Model 185 vehicle draws its cooling air from intake openings positioned near the bottom of the hood enclosure, the sounds radiating through those openings are sufficiently removed from the operator's ears to reduce the contribution of those sound sources to the total sound level encountered by the operator. Accordingly, the enclosed hood structure and foam has proven satisfactory for limiting the sound levels encountered by operators of the Model 185 air cooled vehicle with its air intake arrangement.

The lawn and garden tractor design of the prevent invention positions the engine air intake at the top of the hood enclosure and close to the operator. This design provides cleaner air for the engine since that air comes from a higher level than air which is drawn into the bottom levels of a hood enclosure and which could be contaminated with grass clippings and similar materials. This air is also cooler since it need not be drawn around the engine and to the fan as is the case with the air drawn into the lower hood openings. While improving the engine cooling, this design allows the engine, component and fan sounds to travel directly out through the air intake opening and to the operator. Accordingly, the decibel levels experienced by the operator can be higher than desired.

To reduce such sound levels in this design and yet permit sufficient cooling air to be made available to the air cooled engine, there is provided in the air intake opening an improved sound wave absorbing apparatus which also permits sufficient air flow to the engine cooling fan.

SUMMARY OF THE INVENTION

The present invention provides a sound wave absorbing apparatus which substantially covers the air intake opening in the top of the engine hood enclosure. This structure intercepts and deflects the various sounds escaping from the engine, its belts, accessories, and cooling fan. Yet the structure also provides for sufficient air intake.

The present invention takes the form of a housing, which restricts the escape of sound waves from the engine compartment through the use of a deflector interposed in the center of an air intake opening in the housing. The deflector includes a pair of generally flat surfaces oriented at angles with respect to the engine noise sources, so that the sound waves impinge on the deflector surfaces and are reflected into sound absorbing material carried in chambers of the housing. To absorb the sound waves, two chambers are provided, each comprised of top, bottom, end and side wall surfaces. The end and side wall surfaces are curved to further deflect and absorb the sound waves. One chamber is extended in length to better contain the deflected waves as they impinge on the chamber walls and are deflected.

To assist in funnelling air to the cooling fan, an angled air flow deflector is positioned over the sound wave deflector to guide the intake air around the sound wave deflector.

DESCRIPTION OF THE PREFERRED EMBODIMENT

Figure 1:
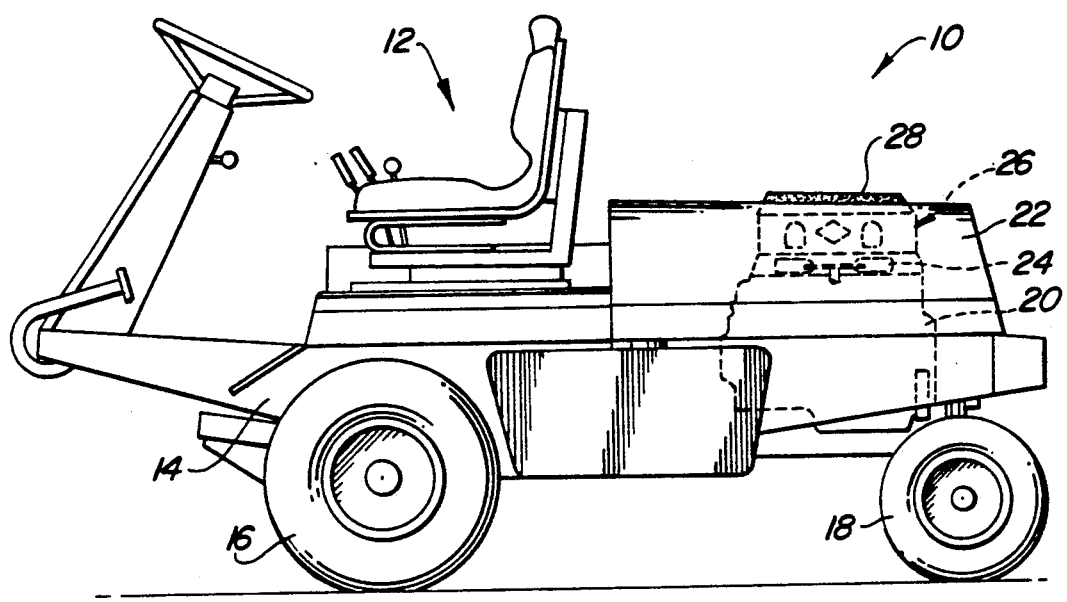
FIG. 1 is a side view of a front mount lawn and garden tractor having an air cooled engine with the invention mounted on the top thereof.

Looking first to FIG. 1, there is illustrated a front mount lawn and garden tractor 10 having a operator's station 12 carried by a frame 14 which in turn is supported by front wheels 16 and rear wheels 18. Rearwardly spaced from the operator's station 12 is an engine 20 covered by a cowling 22, the cowling 22 having an opening in the top through which the cooling air is drawn towards the engine 20 by a fan 24 mounted on the top of the engine 20. The fan 24 is positioned beneath a baffle 26 which in turn carries on its top a screen 28.

Figure 4:
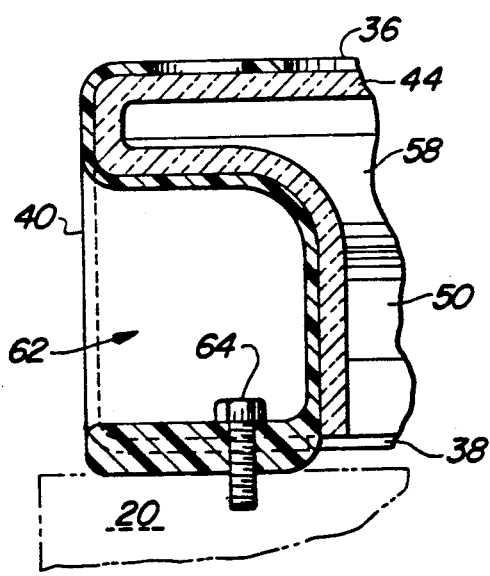
FIG. 4 is a partial view taken along line 4—4 of FIG. 3.
Figure 2:
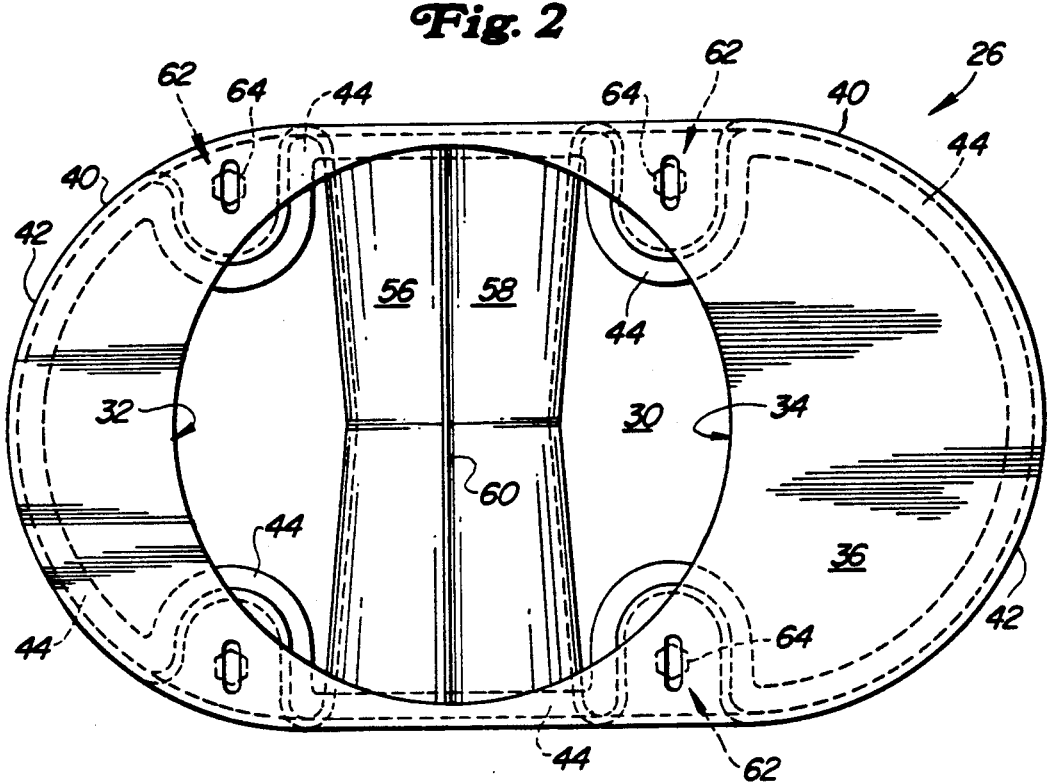
FIG. 2 is a top view of the air baffle and sound wave absorbing apparatus.
Figure 3:
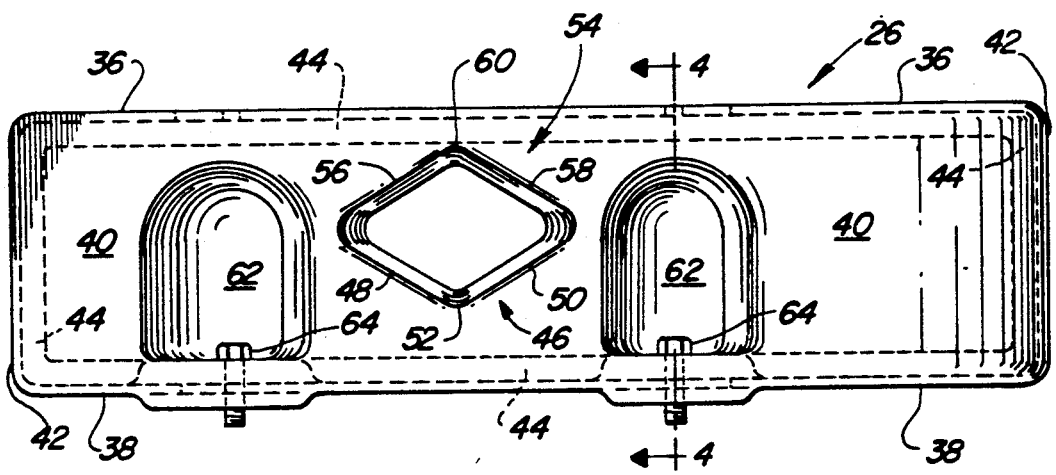
FIG. 3 is a side view of the apparatus.

The baffle 26, which is better illustrated in FIGS. 2, 3 and 4, is a combination sound wave absorbing apparatus and cooling air intake structure. The apparatus 26 includes a housing which has an opening 30 passing therethrough for cooling air to be drawn by the fan 24 towards the engine 20. The housing includes first and second chambers 32 and 34, each of which respectively include top, bottom, side and end walls 36, 38, 40 and 42, forming an opening facing the passage 30. The side and end walls 40 and 42 are curved, having a radius centered generally in the passage 30. The right chamber 34, as viewed in FIG. 2, is larger than the left chamber 32 and is better able to absorb sound waves radiating from the engine 20 and its components and deflect them therein.

Each chamber 32 and 34 carries a layer of acoustical material 44 designed to absorb sound waves. In the preferred embodiment, a polyester open-cell foam has been found to be satisfactory for this purpose. The acoustical material 44 is adhesive backed one-half inch foam in the preferred embodiment and covers the side walls 40, end walls 42, top and bottom walls 36 and 38 of the baffle 26.

Placed in the passage 30 is a sound wave deflecting means 46 comprised of two inclined surfaces 48 and 50 having their apex 52 nearest the engine 20. Positioned over the sound wave deflecting means 46 is an air deflecting means 54 comprised of adjoining surfaces 56 and 58 having their apex 60 pointed upwardly, the edges of those surfaces 56 and 58 joining the sound wave deflecting surfaces 48 and 50. These four surfaces 56, 58, 60 and 62 together provide a rhomboidal cross sectional configuration, as illustrated in FIGS. 2 and 3.

The apparatus 26 further includes recessed mounting structures 62 carried in each side for bolting the apparatus 26 to the engine 20. FIG. 4 particularly illustrates the form of the recess 62 and the bolt means 64 for connecting the apparatus 26 to the engine 20.

In operation, the apparatus 26 is bolted to or carried upon the top of the engine 20 above the air intake fan 24, which is designed to provide the air flow for cooling the air cooled engine 20. A screen 28 is carried on top of the apparatus 26 for preventing various contaminants, such as grass clippings, sticks and other materials, from entering the air stream provided by the cooling fan 24. This screen 28 projects through an opening in the top of the engine cowling or hood 22 and is positioned just rearwardly of the operator's station 12 on the hood 22.

During operation, the fan 24 draws air in through the passage 28 in the apparatus 26, that air being deflected around the surfaces 56 and 58 and through the passage 30 into the fan 34 and around the engine 20.

Concurrently, noises or sound waves emitted by the engine 20, its components, and the cooling fan 24 would radiate from those components. Many of the sound waves would be deflected by the cowling or hood 22 and absorbed by the hood 22, engine 20 and other components beneath the cowling 22. Those sound waves, however, which are radiated upwardly and which would pass through the passage or air intake opening 30 would, in large part, encounter the sound wave deflecting surfaces 48 and 50. As they are deflected from the surfaces 48 and 50 and into a chamber 32 or 34, they would in turn be absorbed by the acoustical foam 44 or further deflected by the curved surfaces of the chambers 32 and 34, and then again encounter the acoustical foam 44.

Air drawn towards the fan 24 during its operation would be deflected or diverted around the air deflecting surfaces 56 and 58 and through the passage 28 in the apparatus 26 to the cooling fan 24, providing a sufficient volume of air for cooling the air cooled engine 20.

Although the operator's station 12 is positioned adjacent the air intake opening 30 in the hood 22, the apparatus 26 provides structure for sufficiently reducing the decibel level of sound waves impinging on the operator's hearing structures and, therefore, reduces the need for the operator to utilize personal sound deadening devices, such as ear plugs. The present invention has been found satisfactory for use on such lawn and garden vehicles having air intake openings positioned in the top of the engine cowling structure and yet also provides satisfactory volumes of air for cooling the engine.

We claim:

1. A combination air intake and sound wave absorbing apparatus usable with a vehicle having an air cooled engine, a fan adapted to generate an air flow onto said engine, and an opertor's station positioned near the engine and fan, said apparatus comprising:
    a housing mountable on the vehicle adjacent the operator's station and positioned so as to allow the fan to be located between it and the engine, said housing including at least one noise suppression chamber adjacent to an air intake passage which extends through the housing and to said fan;
    sound wave deflecting means positioned in a portion of said intake passage, said deflecting means including at least one surface inclined towards both the engine and the chamber for intercepting sound waves emanating from the engine and deflecting them towards the chamber; and
    sound wave absorbing material carried in the chamber for receiving and absorbing said sound waves.

2. The invention defined in claim 1 wherein the chamber includes top, bottom and side walls having an opening facing the passage in the housing.

3. The invention defined in claim 2 wherein the side walls take the form of an arc having a center adjacent the passage in the housing.

4. The invention defined in claim 2 wherein sound wave absorbing material is carried by the walls.

5. The invention defined in claim 1 wherein the deflecting means includes a pair of inclined surfaces, said surfaces extending across a substantial portion of the passage and having adjoining edges nearer the engine than the non-adjoining edges of such inclined surfaces.

6. The invention defined in claim 1 wherein there is further provided means for deflecting air around the sound wave deflecting means, through the passage in the housing and to the fan.

7. The invention defined in claim 6 wherein the sound wave deflecting means and air deflecting means are combined into an elongated member having a generally rhomboidal cross sectional configuration.

8. The invention defined in claim 1 wherein the housing is elongated, includes two opposing chambers adjacent to the passage, said chambers having top, bottom and side walls with sound absorbing material carried therein.

9. The invention defined in claim 8 wherein the sound wave deflecting means includes a pair of elongated generally flat surfaces joined along adjacent edges and forming a V-shaped member having its apex directed towards the engine.

10. The invention defined in claim 1 wherein the housing is carried above the engine with the passage extending generally vertically through the housing.

11. The invention defined in claim 1 wherein the sound wave absorbing material is polyester open-cell foam.

12. A combination air intake and sound wave absorbing apparatus for absorbing sound waves emanating from a vehicle having an air-cooled engine and a fan carried above the engine and adapted to generate an air flow onto the engine, the vehicle also having an operator's station carried adjacent the engine and fan, said apparatus comprising:

a housing mountable on the vehicle adjacent the engine, said housing having first and second spaced apart chambers adjacent to and opening toward an air inlet passage through said housing, each chamber being formed by top, bottom and side walls;

sound wave absorbing material carried in each chamber; and sound wave deflecting means carried in the air inlet passage and between the chambers for deflecting sound waves emanating from the fan and engine towards the absorbing material.

13. The invention defined in claim 12 wherein air deflecting means is carried above the sound wave deflecting means for directing air around said wave deflecting means, through said passage and to the fan.

14. The invention defined in claim 12 wherein an elongated member having a rhomboidal cross section comprises the air deflecting means and the sound wave deflecting means.

15. The invention defined in claim 1 wherein the housing is positioned above the engine and fan and the passage permits air to be drawn by the fan from above the housing, through it and to the fan.

16. The invention defined in claim 1 wherein the apparatus is carried above the fan which in turn is carried above the engine.

* * * * *